(12) United States Patent
Mies

(10) Patent No.: US 7,942,482 B2
(45) Date of Patent: May 17, 2011

(54) BRAKE SYSTEM

(75) Inventor: Hubertus Mies, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 1278 days.

(21) Appl. No.: 10/546,040

(22) PCT Filed: Feb. 27, 2004

(86) PCT No.: PCT/DE2004/000368
§ 371 (c)(1),
(2), (4) Date: Sep. 30, 2005

(87) PCT Pub. No.: WO2004/076253
PCT Pub. Date: Sep. 10, 2004

(65) Prior Publication Data
US 2006/0097565 A1    May 11, 2006

(30) Foreign Application Priority Data

Feb. 28, 2003 (DE) .................. 103 09 139
Jun. 6, 2003 (DE) .................. 103 25 875

(51) Int. Cl.
*B60T 13/00* (2006.01)
(52) U.S. Cl. ............... 303/9.61; 303/9.63; 188/72.5; 188/345
(58) Field of Classification Search .......... 303/9.61, 303/9.62, 9.63, 9.64; 188/345, 72.1, 72.5, 188/349, 106 P, 249
See application file for complete search history.

(56) References Cited

U.S. PATENT DOCUMENTS

| | | | |
|---|---|---|---|
| 3,863,991 A * | 2/1975 | Wilson | 303/9.61 |
| 3,918,765 A | 11/1975 | Hayashida | |
| 4,702,330 A * | 10/1987 | Vatter et al. | 180/6.2 |
| 5,273,346 A * | 12/1993 | Tsuchida et al. | 303/2 |
| 5,501,511 A * | 3/1996 | Wagner | 303/9.64 |
| 6,382,374 B1 * | 5/2002 | Iwai et al. | 188/345 |
| 6,390,566 B1 * | 5/2002 | Matsuno | 303/9.64 |
| 6,616,246 B1 * | 9/2003 | Williamson et al. | 303/9.62 |
| 7,431,131 B1 * | 10/2008 | Chevalier | 188/72.1 |
| 2005/0218719 A1 * | 10/2005 | Hatipoglu et al. | 303/188 |

FOREIGN PATENT DOCUMENTS

| | | |
|---|---|---|
| DE | 42 12 032 C1 | 9/1993 |
| DE | 43 22 634 A1 | 1/1995 |
| EP | 1 201 523 A2 | 5/2002 |
| JP | 09-142271 | 6/1997 |
| WO | WO 97/02964 | 1/1997 |
| WO | WO 00/18626 * | 4/2000 |

* cited by examiner

*Primary Examiner* — Bradley T King
*Assistant Examiner* — Thomas Irvin
(74) *Attorney, Agent, or Firm* — Oliff & Berridge, PLC

(57) ABSTRACT

What is disclosed is a brake system for a mobile machine, e.g., for a wheel loader, comprising two hydraulic circuits to each of which at least one respective wheel brake cylinder is associated. Control of the wheel brake cylinders is effected through a brake valve arrangement which, in accordance with the invention, is formed by two brake valves each realized with a hydraulic pilot control, wherein the braking pressure at the one brake valve is reported via a control line into a pilot control chamber of the other brake valve.

13 Claims, 3 Drawing Sheets

BRAKE SYSTEM

The invention concerns a brake system for a mobile machine in accordance with the preamble of claim 1.

Heavy-duty vehicles in construction, agriculture and forestry, as well as special-purpose vehicles are frequently deployed in difficult terrain and must possess brake systems having a high degree of operational safety at low operating forces. The legal requirements to the brake can in the case of heavy vehicles only be satisfied with the aid of a power brake. As a rule, hydraulic brake systems are preferred over pneumatically acting systems in mobile machines such as construction or forestry machinery.

A vehicle must as a general rule be equipped with a service brake, a secondary brake, and a lock-type brake. The service brake and the secondary brake must be capable of controlled operation. In the case of the lock-type brake, which generally is a so-called spring-loaded brake adapted to be inversely operated with the aid of a hand brake valve, black-and-white operation is sufficient. In realizing the service brake function and the secondary brake function it is customary to employ a two-circuit brake system in which the wheel brake cylinders of the machine may be controlled through two hydraulic brake circuits. The braking function is then as a rule actuated by means of a brake pedal that acts on a two-circuit-brake valve, as is described in DE 43 22 634 A1. The brake valve in accordance with the known solution comprises two consecutively arranged regulating pistons whereby a respective braking pressure passage may be connected with a supply passage connected to a hydraulic accumulator or with a tank passage, so that upon operation of the pedal, both regulating pistons are displaced and a corresponding braking pressure is built up in each one of the brake circuits. Such a two-circuit brake valve may also be provided with a hydraulic pilot control in accordance with JP 9142271.

Although two brake circuits are provided in this known solution, a brake failure may nevertheless still occur if, for instance, the pedal can not be operated (pebble located under the pedal), or if one of the two regulating pistons is jammed, so that the other regulating piston also can not be displaced any more. If the valve or the pedal, i.e., the service brake and the secondary brake, fail, then only the lock-type brake is available as an "emergency brake". This is under the condition that the lock-type brake is correspondingly designed, e.g., as a dynamically acting multiple-disk brake in the drive train.

In view of this, the invention is based on the object of furnishing a brake system for a mobile machine, wherein the fail-safe property of the service brake and of the secondary brake is enhanced at minimum complexity in terms of apparatus technology.

This object is achieved through a brake system for a mobile machine in accordance with claim 1.

In accordance with the invention, the brake system comprises two brake circuits to each of which at least one wheel brake cylinder is associated. Each brake circuit has its own brake valve, for example a single-circuit brake valve, whereby pressure medium may be applied to the associated wheel brake cylinders. Both brake valves may be actuated mechanically and hydraulically, wherein the respective braking pressure output by one brake valve may be conducted into a control chamber of the other brake valve, so that this other brake valve is in effect operated by the former brake valve. I.e., by a mechanical actuation of the one brake valve the other brake valve is controlled hydraulically, so that even in the event of blockage of the regulating piston of the other, hydraulically actuated, brake valve the former brake valve may still be actuated. The invention may be employed to particular advantage in a brake system designed with two brake pedals—e.g., wheel loaders. In this case the operational safety is ensured even when a brake pedal is blocked, for instance by a pebble, or when a regulating piston is blocked. The operator may then activate both (case of blocked pedal) or the other brake circuit (case of blocked regulating piston) by operating the respective other brake pedal, so that the service brake and also the secondary brake are realized with minimum complexity in terms of apparatus technology. Emergency braking may then be performed, for instance, by operating an emergency brake switch, whereby a hydraulic control pressure is applied to both brake valves, so that the wheel brake cylinders of both axles are supplied with pressure medium. Following braking of the vehicle, a mechanical apparatus then blocks the drive train.

In order to avoid undesirable interactions with the mechanically applied braking force (pedal force), it is possible to associate to each brake valve a directional control valve whereby the connection of the control chamber of the one, pedal-operated valve to the brake port of the other valve is blocked, so that no control pressure is built up in the control chamber of the pedal-operated valve.

This directional control valve may, e.g., be formed by a two-way valve, the piston of which is shifted into its blocking position by the pedal or by an actuation piston actuated by the pedal.

In order to realize an emergency brake, or for purposely braking the machine under certain operating conditions—independently of operation of a pedal—the brake valves are provided with an additional pilot control port, whereby an external control pressure may be applied to the brake valves so as to shift their regulating pistons into their regulating positions.

This external pilot control pressure is in one preferred embodiment controlled through a pressure reducing valve provided in pilot control lines leading to the pilot control ports of the two brake valves.

In a preferred embodiment of the invention, the actuation piston adapted to be shifted through the intermediary of the pedal is executed in two parts with a main piston and a pilot control piston guided therein. The above mentioned external pilot control pressure acts on the comparatively large end face of the main piston, whereas the smaller pilot control piston is adapted to be subjected to the pressure acting on the brake port of the respective other brake valve.

Connection of a control chamber limited by the control piston with the control port is preferably carried out through jacket bores of the main piston that are connected with the control port via an annular groove. By suitably selecting the axial length of the annular groove it is possible to form a control edge at the outer periphery of the main piston, whereby the connection with the control port may be closed by actuating the main piston with the aid of the pedal. I.e., in this solution the above mentioned directional control valve is in effect formed by interaction of a control edge of the main piston with a passage leading to the control port.

Hydraulic connection of the pilot control chamber limited by the larger end face of the main piston is preferably effected through the main piston, so that the pilot control housing receiving the main piston has a very simple design.

An actuation pin adapted to be shifted by the pedal is preferably mounted with play in the actuation piston.

The actuation piston or the main piston and the pilot control piston, respectively, are biased into their basic positions through the intermediary of a regulating spring arrangement.

The spring chamber accommodating the regulating spring arrangement is in a preferred embodiment relieved towards the tank.

Other advantageous developments of the invention are subject matter of further subclaims.

In the following, preferred embodiments of the invention are explained in more detail by referring to schematic drawings, wherein.

Figure 1:
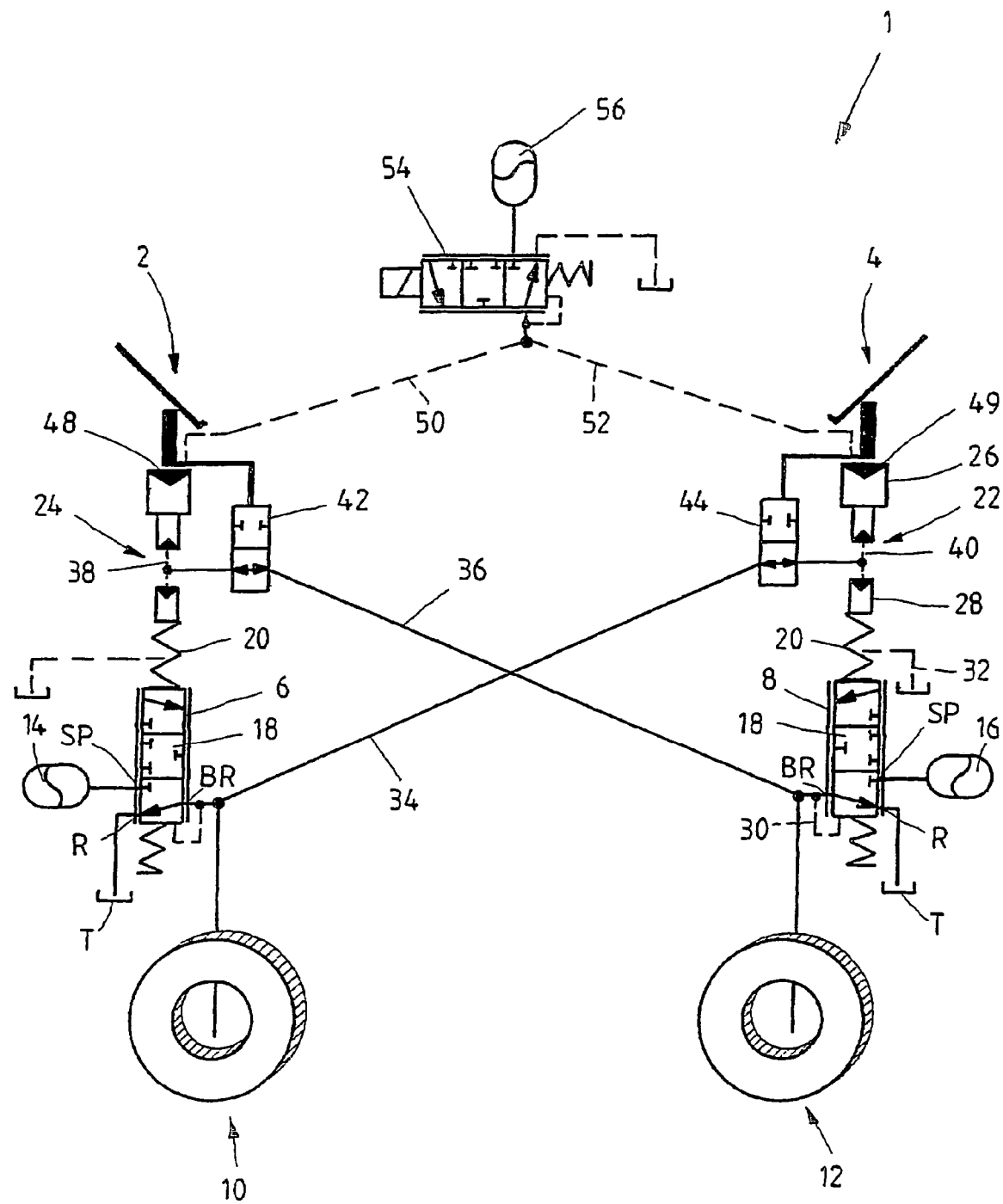
FIG. 1 shows a circuit diagram of a brake system in accordance with the invention for a hydraulic machine such as a wheel loader.

FIG. 1 shows a circuit diagram of a brake system 1 for a hydraulic machine, e.g., for a wheel loader. This is executed with two brake pedals. By means of the brake pedals 2, 4 it is possible to actuate a respective brake valve 6 or 8, to the brake port BR of which wheel cylinders 10, 12 (schematically indicated in FIG. 1) are connected, so that it is possible, e.g., to activate the wheel brake cylinder 10 of the front axle via the brake valve 6, and the wheel brake cylinder 12 of the rear axle via the brake valve 8.

As will be explained hereinbelow in more detail, upon operation of one of the two brake pedals 2, 4 both brake valves 6, 8 are activated mechanically or hydraulically, respectively, so that the wheel brake cylinders 10, 12 are accordingly moreover supplied with pressure medium for engaging the brakes. It is thus the principle of a two-circuit-brake system wherein, however, instead of a conventional tandem valve (two-circuit-brake valve) two comparatively more simple valves are used, as employed, e.g., in single-circuit brake systems.

The brake valves 6, 8 have in addition to the above mentioned brake port BR a reservoir port SP connected with a respective hydraulic accumulator 14, 16, as well as a tank port R connected with a tank T.

A regulating piston 18 of the brake valves 6, 8 is biased through the intermediary of a spring arrangement into a basic position wherein the brake port BR is connected with the tank port T, so that the wheel brake cylinders are not subjected to a braking pressure. The regulating piston 18 is in this case acted on by a regulating spring arrangement 20 in a direction of closing the connection from the brake port BR to the tank port R. The tension of the regulating spring arrangement 20 may be changed with the aid of operating means 22, 24 that are in operative connection with the associated brake pedal 2 or 4, respectively. Each operating means 22, 24 has a main piston 26 and a control piston 28 which are supported on the regulating spring arrangement 22. Accordingly the regulating piston 18 may be shifted downward from its represented basic position (view of FIG. 1) by operating the brake pedals 2, 4 and a corresponding displacement of the main piston 26, in order to initiate a braking process. The braking pressure prevailing at the brake port BR acts via a control line 30 on a respective control surface of the brake valve 6, 8 acting in the closing direction (connection BR with R), whereas a spring chamber receiving the regulating spring arrangement 20 is connected with the drain through a tank line 32. The respective braking pressure prevailing at the brake port BR of a brake valve 6, 8 is reported via a control line 34 or 36 into a control chamber 38 or 40 of the respective other brake valve 8, 6, so that the control piston 28 is subjected to this control pressure in the control chamber 38 or 40 in the direction of an increase of the spring tension. In this embodiment there is moreover associated to each brake valve 6, 8 a two-way valve 42, 44 whereby, upon operation of a brake pedal 2, 4, the connection between the control chamber 38, 40 of the brake valve operated through the brake pedal 2, 4 may be closed through the brake port BR of the respective other brake valve 6, 8. Hereby the pilot control pressure in the associated control line 34, 36 is prevented from superseding the mechanical force applied by the brake pedal 2, 4.

Upon actuation of, e.g., the brake pedal 2, initially the main piston 26 with the pilot control piston 28 is pushed downward (FIG. 1), whereby the regulating spring arrangement 20 is biased. At the same time the directional control valve 42 is taken into its blocking position, so that the control passage 36 is blocked towards the brake port BR of the other brake valve 8. Due to the increased bias of the regulating spring arrangement 20, the regulating piston 18 of the brake valve 6 is displaced downward from its basic position, and initially the connection between the brake port BR and the tank port R is closed, and then the connection between the reservoir port SP and the brake port BR is gradually opened, so that pressure medium is conducted to the wheel brake cylinders 10. Depending on the deflection of the brake pedal 2, the regulating piston 18 assumes a regulating position that determines the braking pressure acting on the wheel brake cylinders 10—the brake valve 6 in effect acts as a pressure reducing valve. At the same time the braking pressure effective at the brake port BR is conducted via the control line 34 and the opened two-way valve 44 into the control chamber 40. This control pressure acts in the direction of an increased tension of the regulating spring arrangement 20, so that as a result of this control pressure in the control chamber 40, the regulating piston 18 of the brake valve 8 is also shifted into a position wherein initially the ports R, SP and BR are closed, and subsequently the connection between the brake port BR and the reservoir port SP is opened. I.e., upon operation of the brake pedal 2, the brake valve 8 associated to the brake pedal 4 is also shifted into its braking position owing to the crosswise connection resulting from the control line 34, so that the wheel brake cylinders of the other axle are also supplied with pressure medium. When the brake pedal 2 is released, it is returned into its represented basic position by the reset force of the lower centering spring in FIG. 1 and by the control pressure in the control line 30 acting in the closing direction and as a result of the relief of the regulating spring arrangement 20, wherein again initially the three ports R, SP, BR are closed, and then the connection from the brake port BR to the tank port R is opened towards T—the braking pressure is reduced in both circuits.

In the embodiment represented in FIG. 1, an additional option is provided in order to activate the two brake valves 6, 8 hydraulically, i.e., without operating any one of the two brake pedals 2, 4. To this end, it is possible to connect pilot control chambers 48 and 49, respectively, which are in portions thereof defined by the main pistons 26, via pilot control passages 50, 52 and a pressure reducing valve 54 with another pressure source which is in the present case a hydraulic accumulator 56. In the represented embodiment the pressure reducing valve 54 is electrically shifted from a position in which the two pilot control passages 50, 52 are connected to drain, into a position in which these two passages 50, 52 are connected with the further hydraulic accumulator 56. Through the pressure reducing valve 54 its pressure is reduced to a pressure level suited for activating the brake system, for instance 25 bar. Instead of electrical activation of the pressure reducing valve 54 it would, of course, also be possible to provide hydraulic activation. Upon activation of the pressure reducing valve 54 the two pilot control chambers 48, 49 are subjected to the pressure acting at the outlet of the pressure reducing valve 54, so that correspondingly both main pistons 26 are shifted, and the regulating spring arrangements 20, 22 of the brake valves 6, 8 are tensioned and correspondingly the regulating pistons 18 of these brake valves are taken into their regulating positions that depend on the pressure at the outlet of the pressure reducing valve 54. I.e., depending on the adjustment of the pressure reducing valve 54 it is possible to set a comparatively low braking effect or full braking.

The particularity of the above described solution is that even when one of the two brake pedals 2, 4 is blocked, all the wheel brake cylinders 10, 12 may still be activated by operating the other pedal. I.e., the secondary brake is in this system realized through the fact that the operator has the possibility to operate the second brake pedal 2 and thereby initiate a braking process even if one brake pedal 4 is blocked. Even if a regulating piston 18 of a brake cylinder 6 or 8 is blocked, a sufficient braking effect is nevertheless ensured as the operator may then activate the secondary brake by operating the respective other brake pedal, so that the associated brake circuit is activated. The emergency brake, which is also prescribed by regulations, may in the above described brake system 1 be realized, e.g., in that the pressure reducing valve 54 is actuated through an emergency brake switch and thus the wheel brake cylinders 10, 12 are supplied with pressure medium through both circuits. It is then possible to do without provision of a costly dynamic brake, such as a multiple-disk brake, in the drive train. In this case it would only be necessary to provide mechanical blocking of the drive train which engages as soon as emergency braking is initiated. Such engagement should, however, only take place once the vehicle has been brought to a standstill via the brake system 1.

Figure 2:
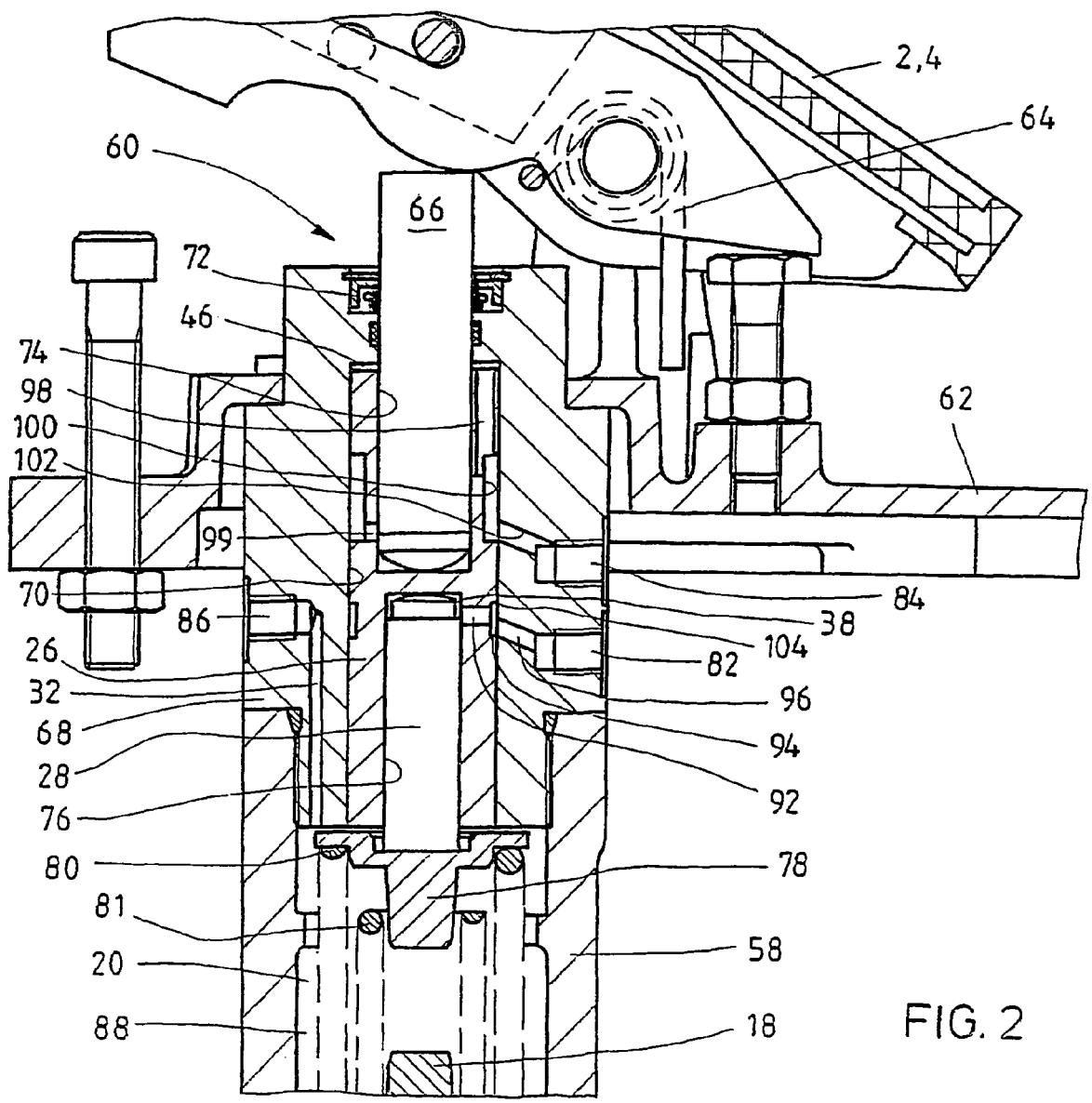
FIG. 2 is a sectional view of a head of a brake valve of the brake system of FIG. 1.

FIG. 2 shows a sectional view of a brake valve 6, 8, with only the one range being represented in which the regulating spring arrangement 20 and the operating means 22, 24 including the brake pedal 2, 4 are arranged. A representation of the regulating piston 18 as well as of the valve housing accommodating the regulating piston and forming the ports BR, R, SP is omitted, and reference is made to the prior art. In FIG. 2 merely the upper part of the regulating piston 18, or of a spring cup supported thereon, is represented. The regulating piston 18 is guided in a brake valve housing 58 on which a brake valve head 60 is arranged.

The latter includes a console 62 on which the brake pedal 2, 4 is mounted in a pivotable manner. The brake pedal 2, 4 is biased through the intermediary of a torsion spring 64 into its basic position determined by a stop. The brake valve head 60 moreover includes an actuation pin 66 which is supported on the bottom side of the brake pedal 2, 4 and shifted downward by the latter in the representation in accordance with FIG. 2. The actuation pin 66 is axially slidably guided in a pilot control housing 68 which is screwed into the brake valve housing 58. The pilot control housing 68 has an axial bore 70 that widens in a downward direction from a guide portion with seals 72 and a sliding guide for the actuation pin 66 towards a reception bore for a main piston 26. The main piston 26 has a blind bore 74 into which the actuation pin 66 plunges slidingly, i.e., with play. In the basic position the lower end face of the fixation pin 66 is supported on the end face of the blind bore 74. At the end portion of the main piston 26 removed from the actuation pin 66, a guide bore 76 is provided which also has the form of a blind bore and in which the control piston 28 is guided in an axially sliding manner. The lower end portion of the control piston 28 in the representation of FIG. 2 protrudes from the main piston 26 and contacts a spring cup 78 which in turn is supported on the lower end face of the pilot control housing 68. The lower end face of the main piston 26 also contacts this spring cup 78. In the represented embodiment, the regulating spring arrangement 20 includes an external regulating spring 80 on which the spring cup 78 rests, and an internal regulating spring 81 arranged coaxially therewith, which enters into contact with the spring cup 78 only following a predetermined axial stroke of the spring cup 78 and thus of the main piston 26 or of the control piston 28, respectively, so that a higher spring rate is then acting.

On the pilot control housing 68 there are moreover provided a control port 82, a pilot control port 84, as well as a tank port 86. The tank port 86 is connected through the intermediary of the tank line 32 formed in the pilot control housing 68 with a spring chamber 88 receiving the regulating spring arrangement 20, so that this spring chamber is pressure-relieved towards the tank.

Between the upper end face of the control piston 28 in the representation of FIG. 2 and the bottom of the guide bore 76 a control chamber 90 is limited in an axial direction, which is connected with the control port 82 through the intermediary of a radial bore 92 and an annular groove 94 of the main piston 26 as well as an oblique bore 96 in the pilot control housing 68.

A pilot control chamber 46 limited by the upper end face of the main piston 26 in the representation of FIG. 2 is connected with the pilot control port 84 through the intermediary of a longitudinal bore 98 as well as peripheral groove 100 of the main piston 26 connecting thereto, and another oblique bore 102 in the pilot control housing 68. The space between actuation pin 66 and main piston 26 is connected with the peripheral groove 16 via a transverse bore 99, so that the main piston 26 receives the pressure in the control chamber 46 on its entire cross-section.

The axial length of the annular groove 94 associated to the control port 82 is selected such that the oblique bore 96 is closed upon an axial displacement of the main piston 26 by a control edge 104. I.e., the annular groove 94 with the control edge 104 of the main piston 26 forms together with the oblique bore 96 the two-way valve 42 or 44, respectively, as represented in FIG. 1.

In the event of a normal brake operation (service brake) the brake pedal 2 is shifted downwards, so that the main piston 26 is displaced downwardly against the force of the regulating spring 80 by the actuation pin 66. Following a predetermined stroke, the spring cup 78 contacts the internal regulating spring 81, so that the further axial displacement of the main piston 26 takes place against a higher spring force. Owing to this axial displacement of the main piston 26, the oblique bore 96 and thus the control port 82 is closed through the intermediary of the control edge 104, so that the control passage 36 (FIG. 1) is closed. In accordance with the pivoting movement of the brake pedal 2 the regulating spring arrangement 20 is thus tensioned, and accordingly the regulating piston 18 of the brake valve 6 assumes its regulating position wherein the brake port BR is connected with the hydraulic accumulator 14. The pressure output at the brake port is tapped and—in accordance with the preceding description—reported via the control passage 34 and the control port 82, the oblique bore 96, the annular groove 94 and the radial bore 92, into the control chamber 104 of the other brake valve 8. As a result of the braking pressure prevailing in the control chamber 104, the control piston 28 is shifted downwardly (FIG. 2) and the spring cup 78 is accordingly raised from the pilot control housing 68, and also the regulating piston 18 of the other brake valve 8 is shifted into a regulating position, so that the wheel brake cylinders 12 associated with this circuit are also supplied with pressure medium. The end face of the control piston 28 is selected such that the manifesting shift corresponds to the one manifesting in the case of the brake valve 6 that is directly actuated through the brake pedal 2. Owing to the pressure in the control chamber 38, the main piston 26 is acted upon in an upward direction, so that it remains in its basic position and the control piston 28 extends out of the main piston 26—the connection between the control chamber 104 and the control port 82 thus remains open in the other brake valve 8.

Figure 3:
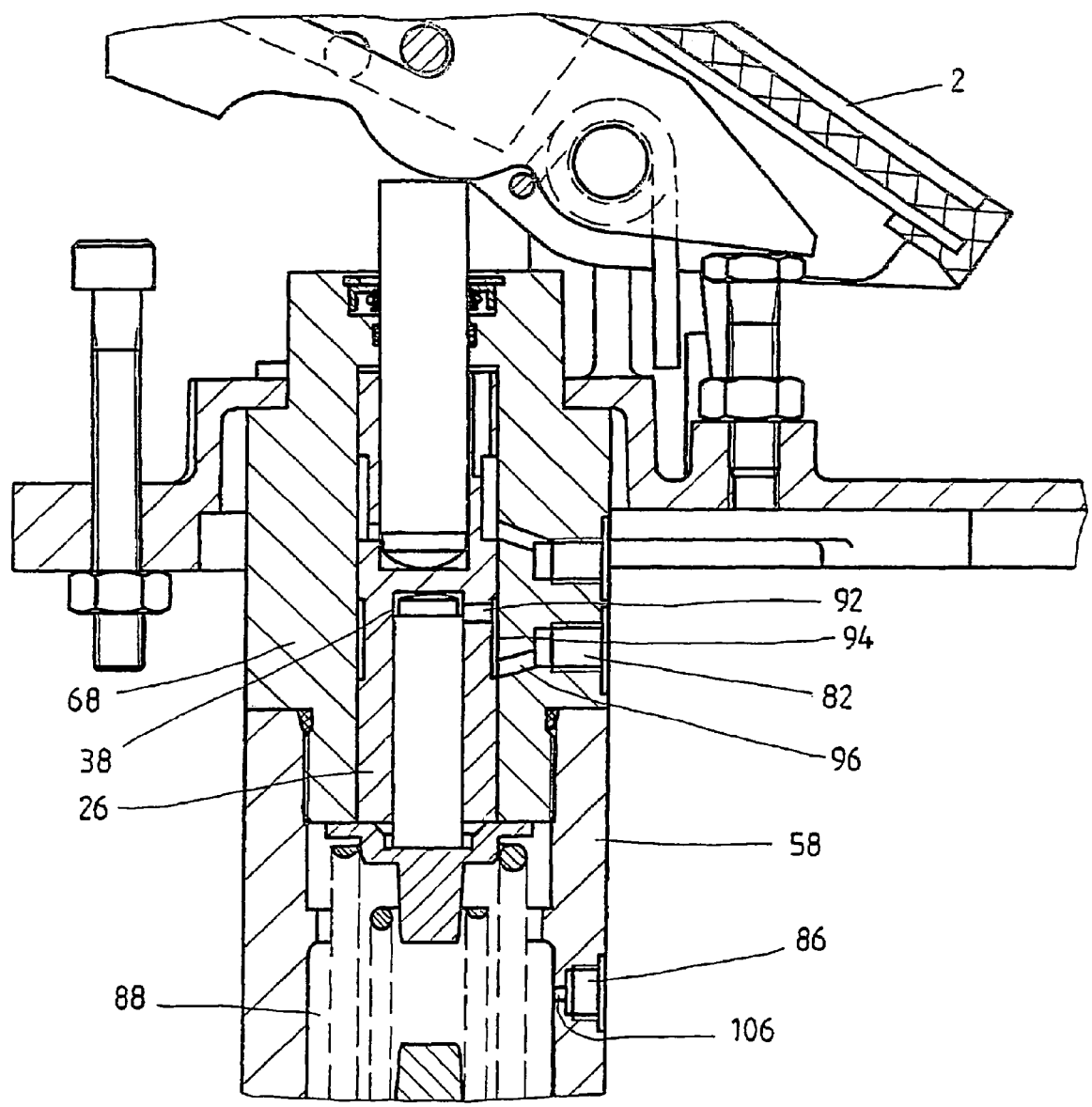
FIG. 3 is a sectional view of a head of another embodiment of a brake valve.

In FIG. 3 a variant of the embodiment represented in FIG. 2 is shown. In this construction the two-way valves 42, 44 were omitted. This change was brought about solely due to the fact that the annular groove 94 of the main piston 26 is executed with a greater axial length than in the previously described embodiment, so that during the entire stroke of the main piston 26 the connection between the control chamber 38 and the control port 82 remains opened. I.e., in this case in both brake valves 6, 8 in the respective control chamber 38 the braking pressure at the brake port BR of the respective other brake valve 8, 6 takes effect. In the one brake valve 6 actuated by means of the brake pedal 2, 4, this control pressure may under certain circumstances interfere with the pedal force introduced through the brake pedal 2—such interactions are excluded in the embodiment represented in FIG. 2.

Through actuation of the pressure reducing valve 54 it is possible to apply a predetermined control pressure to the control chambers 46 of the brake valves 6, 8 via the two pilot control passages 50, 52 connected to the pilot control ports 84 of the brake valves 6, 8, so that the main piston 26 is displaced downwardly by the pressure acting on its entire end face against the force of the spring arrangement 20, and the regulating piston 18 is shifted into a regulating position corresponding to the pressure. This actuation of the brake valves 6, 8 may be effected solely on the basis of a pilot control pressure via the pressure reducing valve.

In order to relieve the pressure of the spring chamber 88, in the embodiment represented in FIG. 3 the tank port 86 is moreover not formed on the pilot control housing 68 but directly on the brake valve housing 58 and connected with the spring chamber 88 via a transverse bore 106.

What is disclosed is a brake system for a mobile machine, e.g., for a wheel loader, comprising two hydraulic circuits to each of which at least one respective wheel brake cylinder is associated. Control of the wheel brake cylinders is effected through a brake valve arrangement which, in accordance with the invention, is formed by two brake valves each realized with a hydraulic pilot control, wherein the braking pressure at the one brake valve is reported via a control line into a pilot control chamber of the other brake valve.

LIST OF REFERENCE NUMERALS

1 brake system
2 brake pedal
4 brake pedal
6 brake valve
8 brake valve
10 wheel brake cylinder
12 wheel brake cylinder
14 hydraulic accumulator
16 hydraulic accumulator
18 regulating piston
20 regulating spring arrangement
22 operating means
24 operating means
26 main piston
28 control piston
30 control line
32 tank line
34 control line
36 control line
38 control chamber
40 control chamber
42 two-way valve
44 two-way valve
48 pilot control chamber
49 pilot control chamber
50 pilot control passage
52 pilot control passage
54 pressure reducing valve
56 hydraulic accumulator
58 brake valve housing
60 brake valve head
62 console
64 torsion spring
66 fixation pin
68 pilot control housing
70 axial bore
74 blind bore
76 guide bore
78 spring cup
80 regulating spring
81 internal regulating spring
82 control port
84 pilot control port
86 tank port
88 spring chamber
90 control chamber
92 radial bore
94 annular groove
96 oblique bore
98 longitudinal bore
99 transverse bore
100 peripheral groove
102 further oblique bore
104 control edge
106 transverse bore

The invention claimed is:

1. A brake system for a mobile machine, comprising first and second hydraulic circuits to each of which at least one wheel brake cylinder is associated that is adapted to be controlled through an intermediary of a brake valve arrangement which may be actuated through an intermediary of mechanical operating means and/or a hydraulic pilot control,
  wherein the brake valve arrangement includes first and second brake valves that are each associated with one of the first and second circuits for supplying a pressure medium having a braking pressure to the associated at least one wheel brake cylinder, with a braking pressure of the first brake valve being conducted via a control passage into a control chamber of the second brake valve as a control pressure for actuating the second brake valve controlling a supply of a pressure medium having a braking pressure to the at least one wheel brake cylinder associated with the second hydraulic circuit, and
  wherein in the control passage, a directional control valve is provided, whereby the connection between the control passage and the control chamber of the second brake valve may be blocked in accordance with operation of the operating means.

2. The brake system in accordance with claim 1, wherein the operating means comprise two brake pedals each acting on one of the brake valves via a respective actuation piston.

3. The brake system in accordance with claim 2, wherein the directional control valve is adapted to be operated through one of the brake pedals or one of the actuation pistons.

4. The brake system in accordance with claim 2, wherein each actuation piston is received in a pilot control housing of the associated one of the brake valves.

5. The brake system in accordance with claim 2, wherein the actuation piston associated with the second brake valve is executed in two parts with a main piston and a control piston guided therein, with a pilot control pressure acting on the main piston defining a pilot control chamber in portions thereof, and the control pressure corresponding to the braking pressure acting on the control piston defining the control chamber in portions thereof.

6. The brake system in accordance with claim 5, wherein the control chamber is connected through a jacket bore of the main piston with a control port that is connected with the control passage.

7. The brake system in accordance with claim 6, wherein the control port is adapted to be closed by a control edge of the main piston.

8. The brake system in accordance with claim 7, wherein the control edge is formed on an annular groove of the main piston.

9. The brake system in accordance with claim 5, wherein the pilot control chamber is connected through the main piston with a pilot control port that is connected with a pressure reducing valve.

10. The brake system in accordance with claim 5, wherein an actuation pin adapted to be acted upon by the associated pedal is inserted with play in the main piston.

11. The brake system in accordance with claim 1, wherein each brake valve has a pilot control chamber and each pilot control chamber of the brake valves is adapted to be subjected to a pilot control pressure.

12. The brake system in accordance with claim 11, wherein the pilot control pressure is reduced to a predetermined level through an intermediary of an associated pressure reducing valve.

13. The brake system in accordance with claim 1, characterized in that, for each brake valve, a spring chamber receives a regulating spring arrangement of the brake valve and is connected to a tank port.

* * * * *